United States Patent [19]

Kelusky

[11] Patent Number: 5,137,975
[45] Date of Patent: Aug. 11, 1992

[54] METHOD FOR MANUFACTURE OF MODIFIED POLYPROPYLENE COMPOSITIONS

[75] Inventor: Eric C. Kelusky, Brights Grove, Canada

[73] Assignee: Du Pont Canada Inc., Mississauga, Canada

[21] Appl. No.: 437,801

[22] Filed: Nov. 17, 1989

[30] Foreign Application Priority Data

Nov. 23, 1988 [GB] United Kingdom ............... 8827335

[51] Int. Cl.$^5$ ................... C08F 255/02; C08F 255/04; C08F 6/26; B29C 47/38
[52] U.S. Cl. ................................. 525/263; 525/285; 525/323; 525/324; 525/327.4; 525/327.8; 525/329.7; 525/369; 264/211.23; 264/211.24
[58] Field of Search .............. 525/263, 285, 323, 324, 525/327.4, 327.8, 329.7, 369; 264/211.23, 211.24

[56] References Cited

U.S. PATENT DOCUMENTS

| | | | |
|---|---|---|---|
| 3,742,093 | 6/1973 | Skidmore | 525/197 |
| 4,283,525 | 8/1981 | Rao | 528/489 |
| 4,695,608 | 9/1987 | Engler | 525/308 |
| 4,698,395 | 10/1987 | Inoue et al. | 525/327.8 |

FOREIGN PATENT DOCUMENTS

| | | |
|---|---|---|
| 1009787 | 5/1977 | Canada . |
| 54-99193 | 8/1979 | Japan . |
| 57-65746 | 4/1982 | Japan . |
| 57-65747 | 4/1982 | Japan . |
| 1519500 | 11/1975 | United Kingdom . |

OTHER PUBLICATIONS

Abstract JP 54"99193-Derwent (1979).
Abstract JP 44-15422-Derwent (1969).
Abstract JP 43-27421-Derwent (1968).
Abstract 53-18144-Derwent (1978).
Abstract 57-144731-Derwent (1982).
Abstract 57-080406-Derwent (1982).
Abstract 56118411 Derwent (1981).

*Primary Examiner*—James J. Seidleck
*Assistant Examiner*—Vasu S. Jagannathan
*Attorney, Agent, or Firm*—Craig H. Evans

[57] ABSTRACT

A method for the treatment of melt-grafted polypropylene to improve adhesive properties thereof is disclosed. Molten grafted polypropylene, formed by melt grafting polypropylene with an alpha,beta unsaturated carboxylic acid or anhydride, is treated in melt processing apparatus with a minor amount of an aqueous solution of an alkaline material e.g. an aqueous solution of sodium hydroxide. The thus treated grafted polypropylene is separated from the aqueous solution and recovered e.g. in the form of pellets. The melt-grafted polypropylene may be formed in the melt processing apparatus prior to treatment with the aqueous solution or polypropylene that has been grafted in a previous operation may be fed to the apparatus. The treated polymer may be used in adhesive formulations.

12 Claims, No Drawings

METHOD FOR MANUFACTURE OF MODIFIED POLYPROPYLENE COMPOSITIONS

The present invention relates to a method for the manufacture of modified polypropylene compositions, and especially to the grafting of alpha,beta unsaturated carboxylic acids and anhydrides on to polypropylene in a manner that results in improved adhesion of the polypropylene to polar materials.

Polypropylene is used in a wide variety of end-uses. However, it is a non-polar polymer and thus tends to exhibit poor or no adhesion to polar materials. A number of proposals have been made to improve the adhesive properties of polypropylene, including the grafting of alpha,beta unsaturated carboxylic acids and anhydrides onto the polypropylene backbone. For example, Japanese patent application No. 44-15422 of F. Ide et al, Mitsubishi Rayon Co., published (kokoku) on Jul. 9, 1969, discloses the grafting of polypropylene in solution. Japanese patent application No. 53-18144 of K. Sadakata et al, Mitsubishi Rayon Co., published (kokoku) on Aug. 1, 1968, discloses the grafting of polypropylene in a slurry state. Japanese patent application No. 43-27421 of F. Ide et al, Mitsubishi Rayon Co., published (kokoku) on Nov. 26, 1968, discloses the grafting of polypropylene in a molten state.

The use of melt grafting techniques has the advantage of being a simple operation, and thus offers the potential of being the most economical method of grafting polypropylene. The grafting of molten propylene polymers is disclosed in U.K. patent 1 519 500 of BASF, published Jul. 26, 1978. However, Japanese patent applications No. 57-65747 of Y. Wachi et al and No. 57-65746 of M. Fujiyama et al (Tokuyama Soda K. K.), both published Apr. 21, 1982, disclose that the grafted polypropylene obtained from a melt grafting process contains residual unreacted monomer. This residual monomer tends to cause lack of adhesion and the formation of blisters e.g. in moulding or other forming operations.

Methods for the removal of the residual monomer are known, including removal of the unreacted monomer using a solvent-precipitation technique and by agitation with a good solvent e.g. xylene, under conditions that do not dissolve the polymer, the latter being disclosed in Japanese patent application No. 54-99193 of Y. Nakajima et al, published Aug. 4, 1979. European patent application 0 202 921 of T. Inoue et al, published Nov. 26, 1986, which corresponds to U.S. Pat. No. 4,698,395, issued Oct. 6, 1987, discloses treatment of grafted polyolefins by adding an aqueous solution of an alkali metal hydroxide to grafted polymer dissolved in organic solvent.

However, processes involving the use of solvent, often large amounts of solvent, add additional steps to the manufacture of grafted polypropylene including steps for the removal of the solvent from the grafted polymer until a commercially-acceptable low lever of residual solvent is obtained in the polymer. The aforementioned application of Y. Wachi et al discloses two methods for the reduction in the amount of monomer viz. heating the grafted composition to a temperature of 60° C. or higher, and blending the grafted polymer with an ethylene/alpha-olefin copolymer and then heating the resultant mixture to a temperature of 60° C. or higher. Compositions of grafted alpha-olefin polymer containing metal carbonates are disclosed in Japanese patent application No. 57,144,731 of Mitsui Polychemicals, published Sep. 7, 1982. Addition of metal compounds e.g. calcium, magnesium or aluminum compounds, to grafted polyolefins is disclosed in Japanese patent application No. 57,080,046 of Toyo Ink Manufacturing KK, published May 20, 1982, and in Canadian Patent No. 1,009,787 of K. Shirayama et al, which issued May 3, 1977. Japanese patent application No. 56,118,411 of Mitsubishi Petrochemical KK, published Sep. 17, 1981, discloses treatment of grafted polyolefin with hot water or hot air at a temperature between the softening point of the grafted polymer and a temperature 25° C. lower than the softening point to improve the adhesion of the grafted polymer.

A method has now been found in which, in a melt grafting process, the component in grafted polypropylene that is believed to be detrimental to adhesion thereof to other materials may be removed and/or the effects thereof reduced.

Accordingly, the present invention provides a method for the treatment of melt-grafted polypropylene formed by the grafting of alpha,beta-unsaturated acids and anhydrides onto polypropylene, said method comprising the steps of:
(a) contacting molten grafted polypropylene in melt processing apparatus with a minor amount of an aqueous solution of an alkaline material, said melt-grafted polypropylene having been formed in melt processing apparatus by the grafting of polypropylene with 0.01 to 5% by weight of at least one of alpha,beta unsaturated carboxylic acids and alpha,-beta-unsaturated carboxylic anhydrides and 0.01 to 2% by weight of an organic peroxide at a temperature above the melting point of the polypropylene;
(b) separating the thus treated grafted polypropylene from the aqueous solution; and
(c) recovering grafted polypropylene.

The present invention further provides a method for the grafting of alpha,beta-unsaturated acids and anhydrides onto polypropylene comprising the steps of:
(a) admixing polypropylene in melt processing apparatus with 0.01 to 5% by weight of at least one of alpha,beta unsaturated carboxylic acids and alpha,beta-unsaturated carboxylic anhydrides and 0.01 to 2% by weight of an organic peroxide at a temperature above the melting point of the polypropylene;
(b) contacting the resultant molten grafted polypropylene in the melt processing apparatus with a minor amount of an aqueous solution of an alkaline material;
(c) separating the thus treated grafted polypropylene from the aqueous solution; and
(d) recovering grafted polypropylene.

In a preferred embodiment of the process of the present invention, the polypropylene is grafted with maleic acid or, preferably, maleic anhydride.

In a further embodiment, the grafted polypropylene is treated with an aqueous solution of sodium hydroxide.

The component which has been believed to cause the detrimental effects in the adhesion of grafted polypropylene has been referred to above as residual monomer i.e. maleic anhydride, if the grafting monomer was maleic anhydride. While there may be evidence to that effect, there are also reasons to believe that detrimental effects are caused by low molecular weight polymers or adducts of maleic anhydride and propylene. It is known that propylene has a tendency to scission or de-polymerize in the presence of organic peroxides, thereby forming propylene monomer, and the propylene monomer may react with the grafting monomer e.g. maleic anhydride, to form a low molecular weight copolymer or an adduct of propylene and maleic anhydride. However, the exact nature of the component that causes the detrimental effects in adhesion of grafted polypropylene to other materials is not critical to the present invention.

As used herein, the expression "polypropylene" refers to homopolymers of propylene, to impact or so-called block copolymers of propylene with ethylene in which the ethylene content is less than 25% by weight and to random copolymers of propylene with ethylene in which the ethylene content is less than 8% by weight. In preferred embodiments, the polypropylene is of relatively high molecular weight, especially polypropylene having a low melt flow index e.g. in the range of 0.5–1.5 dg/min, although the method of the present invention is not restricted to such polymers and may be used with polypropylenes having a broad range of molecular weights i.e. a broad range of melt flow indices.

The melt processing apparatus used in the method of the present invention preferably has a feed section, a section in which the grafted polymer may be contacted with a minor amount of the aqueous solution of alkaline material and a dies or other device through which the grafted and treated polymer is discharged from the melt processing apparatus; if melt-grafted polypropylene is fed to the extruder, it is not necessary to have a section in the melt processing apparatus in which a grafting reaction may occur. The section in which the polymer is contacted with the aqueous solution would have an inlet port and an outlet port; the outlet port may be located upstream or downstream of the inlet port, or both. Melt processing apparatus having such ports is known, examples of which are extruders obtainable from Welding Engineers Inc. of Blue Bell, Pennsylvania, U.S.A., an embodiment of which is described in R. H. Skidmore U.S. Pat. No. 3,742,093, which issued Jun. 26, 1973. Techniques for obtaining low of solutions counter current to the extrusion of polymer in extruders is described in that patent. In preferred embodiments of the present invention, the melt processing apparatus is a twin screw extruder that is equipped with non-intermeshing screws. The use of such apparatus in the grafting of monomers onto polypropylene is described in greater detail in the copending patent application of E. C. Kelusky (Case DC-0238) filed on the same day as this application.

The melt processing apparatus is equipped with a mixing screw that is adapted to admix the components fed to the melt processing apparatus and to admix the grafted polymer with the aqueous solution of the alkaline material. It is most important, especially with respect to the uniformity of the product obtained by the method of the present invention, that a sufficiently high degree of mixing be achieved both during any grafting step and during the treatment step with alkaline material.

In the preferred method of the invention, polypropylene, grafting monomer and organic peroxide are fed to the melt processing apparatus. The polypropylene is as defined above, with homopolymer being preferred. The molecular weight of the polypropylene will depend on the intended end-use of the grafted polymer, it being understood that the molecular weight of the polypropylene will likely be decreased significantly during the grafting reaction, as will be understood by those skilled in the art.

The grafting monomer is at least one of alpha,beta-ethylenically unsaturated carboxylic acids and anhydrides, including derivatives of such acids and anhydrides, and including mixtures thereof. Examples of the acids and anhydrides, which may be mono-, di- or polycarboxylic acids, are acrylic acid, methacrylic acid, maleic acid, fumaric acid, itaconic acid, crotonic acid, itaconic anhydride, maleic anhydride and substituted maleic anhydride e.g. dimethyl maleic anhydride. Examples of derivatives of the unsaturated acids are salts, amides, imides and esters e.g. mono- and disodium maleate, acrylamide, maleimide and diethyl fumarate.

The amount of grafting monomer is in the range of 0.01 to 5% by weight of the polymer. In preferred embodiments, the amount of grafting monomer is in the range of 0.1 to 2%, especially 0.2 to 1.5% and particularly 0.2 to 0.6%, by weight of the polymer. The grafting monomer may be fed directly to the melt processing apparatus or, alternatively, coated onto pellets or other comminuted shapes of a polymer or blended into polymer and fed to the melt processing apparatus. The polymer may be the polymer that is to be grafted or, preferably, is a polymer of higher melt index i.e. lower molecular weight, so as to facilitate admixing of polypropylene with the grafting monomer.

The organic peroxide, which as used herein includes hydroperoxides, may for example be a bis(tert. alkyl peroxy alkyl) benzene, dicumyl peroxide or acetylenic diperoxy compound. Other organic peroxides are known to those skilled in the art, including t-butyl hydroperoxide and di-t-butyl peroxide. The peroxides used in the method of the present invention preferably have a half-life at 150° C. of from about one minute to about 120 minutes. A preferred organic peroxide is 2,5-dimethyl-2,5-bis-(tert. butyl peroxyisopropyl) benzene which is available under the trademark Vulcup from Hercules Inc. Other preferred organic peroxides are 2,5-dimethyl-2,5-di-(tert. butyl peroxy) hexane and 2,5-dimethyl-2,5-di-(tert. butyl peroxy) hexyne-3, which are available under the trademarks Lupersol 101 and Lupersol 130, respectively, from Lucidol Division of Pennwalt Corporation.

The amount of organic peroxide is in the range of 0.01% to 1% by weight of the polymer, especially in the range 0.05 to 0.5% by weight of the polymer. However, as will be understood by those skilled in the art, the amount of organic peroxide may depend on the nature and amount of any additives in the polymer. For example, the polypropylene may contain stabilizing agents, especially antioxidants, although it is preferred that stabilizing agents be added subsequent to both the grafting reaction and the treatment step in the method of the present invention. The organic peroxide may be fed directly to the melt processing apparatus or, alternatively, coated onto pellets or other comminuted shapes of a polymer or blended into polymer and fed to the melt processing apparatus. The polymer may be the polymer that is to be grafted or, preferably, is a polymer of higher melt index i.e. lower molecular weight, so as to facilitate admixing of polypropylene with the organic peroxide.

In embodiments, the polypropylene, grafting monomer and organic peroxide are admixed in the melt processing apparatus under conditions such that the polymer is in a molten state and which provide a degree of mixing of polymer, monomer and organic peroxide so that a grafted product of commercially acceptable uniformity is obtained. Such a degree of mixing will be understood by those skilled in the art. The temperature of the polymer will be above the melting point of the polymer; it will, however, be appreciated that chain scission of polypropylene tends to occur more readily at higher temperatures, which lowers the molecular weight of the polymer, and thus the temperature of the polymer is usually controlled above but relatively close to the melting point of the polymer. The organic peroxide will be selected so that the half-life of the peroxide under the melt processing conditions is of a sufficient duration to obtain the uniform product. As will be appreciated, if the half-life is too short the uniformity of the grafting process will be affected, and if the half-life is too long the amount of organic peroxide that has not decomposed when the treatment step is reached will be at too high a level, to the detriment of the uniformity and quality of the product. For example, the period of time that the polypropylene is in a molten condition in the melt processing apparatus prior to reaching the treatment with alkaline material should be at least five times the half-life of the organic peroxide at the temperature of the polypropylene.

The grafted polypropylene, whether grafted in the melt processing apparatus or fed as such to the melt processing apparatus, is contacted with an aqueous solution of an alkaline material. The alkaline material is preferably an alkali metal hydroxide, carbonate and/or bicarbonate, of which sodium hydroxide is the preferred alkaline material. The alkaline material must be capable of being dissolved or uniformly dispersed in a fine particle size in the aqueous solution, so that a high degree of mixing of polymer and alkaline material is obtainable in the melt processing apparatus.

In the method, the aqueous solution is fed to the inlet port of the melt processing apparatus and admixed with the grafted polymer in the melt processing apparatus. Preferably, a high degree of admixing of the aqueous solution and polymer is achieved, so that a high degree of contact between the alkaline material and the residual monomer, or other monomer by-products e.g. by-products formed in reactions with maleic acid or anhydride, is obtained prior to the aqueous solution passing from the melt processing apparatus through the outlet port. The amount of treatment achieved and hence the potential improvement in the adhesion obtainable with the grafted polypropylene will be related to the degree of admixing achieved between the grafted polymer and alkaline material. In an embodiment of the method of the invention, a 0.05-15% by weight, especially 0.1-10% by weight, aqueous solution of sodium hydroxide is fed to the melt processing apparatus such that the rate of flow of solution is 1-15%, especially 3-7%, by weight, of the rate of extrusion of the polymer through the melt processing apparatus.

Subsequent to the treatment of the grafted polymer with alkaline material, the treated polymer is discharged from the melt processing apparatus. For example, the treated polymer may be extruded through a die and converted to a suitable comminuted shape e.g. pellets.

In embodiments of the method of the invention, additional polymers and/or stabilizing agents, pigments or the like are added to the grafted polymer subsequent to the treatment with alkaline material but prior to extrusion of the grafted polymer from the melt processing apparatus. For example, additional polypropylene may be added, especially to decrease the melt index of the grafted polymer composition. Toughening agents, for example, elastomers may be added e.g. in amounts of up to about 25% by weight of the composition, but any such toughening agents should be highly dispersed in the resultant composition. Furthermore, metal oxides or hydroxides e.g. calcium oxide, may be added, for example in amounts of up to 10% by weight, to further improve the adhesive characteristics of the resultant composition.

As noted above, the method of treatment of the grafted material with alkaline material may be operated by feeding a grafted polypropylene to the melt processing apparatus, rather than the mixture of polymer, monomer and organic peroxide. Thus the grafted polymer would be fed to the apparatus and, in a molten state, contacted with the alkaline material.

The grafted polypropylene that has been treated using the method of the present invention may be used in a variety of end-uses, including in adhesive compositions. For instance, the grafted polypropylene may be admixed with other polymers, examples of which are polyethylene, polypropylene, ethylene/vinyl acetate copolymers, ethylene/ethyl acrylate or methacrylate copolymers, ethylene/carbon monoxide/alkyl acrylate copolymers, elastomeric copolymers and the like, in order to form adhesive compositions.

The present invention is illustrated by the following examples:

EXAMPLE I

The extruder used in this example was a 2.0 cm non-intermeshing, counter-rotating twin screws extruder. The extruder had a barrel with a ratio of length:diameter (L/D) of 60:1, and was equipped with vents ports at L/D positions (as measured from the inlet) of 33:1 and 45:1 and a liquid (solvent) injection port between the vents, at an L/D of 40:1. The extruder was operated at 350 rpm and a barrel temperature of 170° C. the polymer was extruded from the extruder in the form of a strand, which was fed to a water bath and pelletized.

The following composition was fed to the inlet of the extruder:
(a) 100 parts by weight of powdered homopolymer polypropylene having a melt flow index of 0.6 dg/min, obtained from Himont Inc. under the trade designation PP6801;
(b) 0.3 parts by weight of Lupersol 101 organic peroxide, which was coated on the powdered polypropylene; and
(c) 0.9 parts by weight of maleic anhydride, which was in the form of a crystalline powder and which was physically admixed with the coated polypropylene.

In Run 1, which was a comparative run, the composition was extruded, without injection of liquid to the extruder and with use of only atmospheric venting at the vent ports. The pelletized grafted polymer obtained was analyzed for graft content using infrared analysis and for residual maleic anhydride using high performance liquid chromatography.

The grafted polymer was tested for adhesion as follows:

A film (0.1 mm) of the grafted polymer, formed by pressing pellets between sheets of Teflon ® fluoropolymer, was placed between sheets of aluminum (0.2 mm) that had been pre-cleaned with carbon tetrachloride. The resultant sandwich was heated at 220° C. for 10 minutes and then pressed (70 kg/cm$^2$) for one minute at 220° C. The laminate obtained was cut into a number of strips measuring 200×25 mm, which were subjected to a 180° peel test, at 23° C. and 50% relative humidity, using an Instron* testing apparatus.
*denotes trade mark In Run 2, which was also a comparative run, the procedure of Run 1 was repeated, except that a vacuum of 100 mm Hg was applied to both of the vent ports.

In Run 3, which was a further comparative run, the procedure of Run 2 was repeated, except that water was injected through the injection port between the vent ports at a rate that was 4.5% of the polymer extrusion rate.

In Run 4, which was a run of the invention, the procedure of Run 3 was repeated, except that an aqueous solution of sodium hydroxide (0.1% by weight) was injected at a rate that was 3.7% of the polymer extrusion rate.

In Run 5, which was a run of the invention, the procedure of Run 4 was repeated except that the aqueous solution contained 1.0% by weight of sodium hydroxide.

In Run 6, which was a comparative run, the procedure of Run 4 was repeated except that the aqueous solution was replaced with acetone.

The adhesion results obtained are reported in Table I.

TABLE I

| Run No. | Vacuum (mm) | Solvent | Grafted Monomer (%)* | Residual Monomer (%)** | Adhesion (g/cm) |
|---|---|---|---|---|---|
| 1 | 0 | — | 0.36 | 735 | 0 |
| 2 | 100 | — | 0.31 | 166 | 500 |
| 3 | 100 | water | 0.26 | 147 | 485 |
| 4 | 100 | 0.1% NaOH | 0.29 | 263 | 555 |
| 5 | 100 | 1.0% NaOH | 0.27 | 163 | 735 |
| 6 | 100 | acetone | 0.25 | 65 | 520 |

*obtained by infrared analysis
**obtained by liquid chromatography

The results show that the application of a vacuum and contacting with a solution improves the adhesive characteristics of the resultant polymer. The runs of the invention, Runs 4 and 5 in which the grafted polymer was washed with sodium hydroxide, gave the best results, especially Run 5 which the grafted polymer was washed with sodium hydroxide, gave the best results, especially Run 5 which used the higher concentration of sodium hydroxide.

EXAMPLE II

The extruder used in this example was a counter rotating, non-intermeshing twin screw extruder having a 2.0 cm screw and an L/D of 72:1. Vents were located in the extruder at L/D's of 51:1 and 63:1, and an injection port was located at 58:1. The temperature of the polymer was 170° C. and the extruder was operated at 400 rpm.

The following polymer composition was fed to the extruder in the form of a mixture:
(a) 100 parts of impact-grade copolymer polypropylene powder having a melt flow index of 0.8 dg/min, obtained from Himont Inc. under the trade designation PP7701;
(b) 1 part of dicumyl peroxide (40% on clay); and (c) 1 part of crystalline maleic anhydride.

The polymer extruded from the extruder was subjected to the same procedure as in Example I.

In Run 7, which was a comparative run, a vacuum of 50 mm was applied at each vent port, but solution was not injected through the injection port.

In Run 8, which was a run of the invention, the procedure of Run 7 was repeated except that an aqueous solution of 0.5% by weight of sodium hydroxide was injected through the injection port at a rate of 5% by weight of the polymer flow.

In Run 9, which was a run of the invention, the procedure of Run 8 was repeated except that the solution was 2.5% by weight of sodium hydroxide.

The results obtained are given in Table II.

TABLE II

| Run No. | Vacuum (mm) | Solvent | Grafted Monomer (%) | Residual Monomer (%) | Adhesion (g/cm) |
|---|---|---|---|---|---|
| 7 | 50 | — | 0.37 | 658 | <180 |
| 8 | 50 | 0.5% NaOH | 0.27 | 88 | 355 |
| 9 | 50 | 2.5% NaOH | 0.27 | 44 | 625 |

The results show that treating with sodium hydroxide improved the adhesive characteristics of the grafted polymer, especially when the higher level of sodium hydroxide was used.

In another peel test, a 0.073 mm thick sample of grafted polymer was pressed to a pre-cleaned aluminum sheet using a heat sealer, at 210° C. and a pressure of 3.6 kg/cm$^2$ for 5 seconds. The peel strengths obtained were as follows: for the grafted polymer of Run 7, 0 g/cm; for the grafted polymer of Run 8, 445 g/cm; and for the grafted polymer of Run 9, >895 g/cm which was the yield strength of the sample of polymer. This test also illustrates the improvement obtained with the present invention.

EXAMPLE III

A homopolymer of propylene was grafted with maleic anhydride, in the presence of an organic peroxide catalyst, in a Berstorff* twin screw extruder. The product obtained contained 0.1% by weight of grafted maleic anhydride and had a melt flow index of 10 dg/min.
*denotes trade mark The grafted polymer was fed to a 5.0 cm counter rotating non-intermeshing twin screw extruder where it was melted and then washed with an aqueous solution of sodium hydroxide using the procedure described in Example I. The grafted and treated polymers were tested for adhesion using the procedure described in Example I. Run 10 is a comparative run, using the grafted polymer prepared on the Berstorff extruder; in Runs 11 to 14, which are runs of the invention, the grafted polymer was subjected to washing with aqueous sodium hydroxide solution as indicated.

Further details and the results obtained are given in Table III.

TABLE III

| Run No. | Vacuum (mm) | Solvent | Adhesion (g/cm) |
|---|---|---|---|
| 10 | — | — | 0* |
| 11 | 50 | 2.5% NaOH | 2680 |
| 12 | 50 | 5.0% NaOH | 1910 |
| 13 | 50 | 7.5% NaOH | 2070 |
| 14 | 50 | 10.0% NaOH | 2790 |

*without treatment with sodium hydroxide solution

The results show that a grafted polymer viz. grafted polypropylene may be formed without being treated as disclosed herein and subsequently treated with the aqueous solution of sodium hydroxide while in the molten condition, according to the method of the present invention, to provide a grafted polymer with good adhesion properties. In this example, treatment of the grafted polymer with water instead of with the alkaline solution resulted in no adhesion in the adhesion test.

The grafted polymer was also washed with acetone but in an adhesion test in which the molten grafted polymer was pressed to aluminum and the adhesion tested by hand, the adhesion obtained was poor.

I claim:

1. A method for the treatment of melt-grafted polypropylene formed by the grafting of alpha,beta-unsaturated acids and anhydrides onto polypropylene, said method consisting essentially of the steps of:
   (a) contacting molten grafted polypropylene in melt processing apparatus with minor amount of an aqueous solution of at least one of a hydroxide, carbonate or bicarbonate of an alkali metal, said melt-grafted polypropylene having been formed in melt processing apparatus by the grafting of polypropylene with 0.01 to 5% by weight of at least one of alpha,beta-unsaturated carboxylic acids and alpha,beta-unsaturated carboxylic anhydrides and 0.01 to 2% by weight of an organic peroxide at a temperature above the melting point of the polypropylene;
   (b) separating the thus treated grafted polypropylene from the aqueous solution; and
   (c) recovering grafted polypropylene.

2. The method of claim 1 in which the grafted polypropylene is treated with an aqueous solution of sodium hydroxide.

3. The method of claim 2 in which the grafted polypropylene is treated with an aqueous solution of 0.05-15% by weight of sodium hydroxide.

4. The method of claim 2 in which the grafted polypropylene is treated with an aqueous solution of 0.1-10% by weight of sodium hydroxide.

5. The method of claim 1 in which the polypropylene is grafted with at least one of maleic acid and maleic anhydride.

6. The method of claim 6 in which the polypropylene is grafted with maleic anhydride and the amount of maleic anhydride is in the range of 0.1 to 0.4% by weight.

7. The method of claim 1 in which the melt-grafted polypropylene is obtained by admixing polypropylene in the melt processing apparatus with 0.01 to 5% by weight of at least one of alpha,beta unsaturated carboxylic acids and alpha,beta-unsaturated carboxylic anhydrides and 0.01 to 2% by weight of an organic peroxide at a temperature above the melting point of the polypropylene, prior to contacting with the aqueous solution of alkaline material.

8. The method of claim 1 in which the amount of organic peroxide is in the range of 0.05 to 0.5% by weight.

9. The method of claim 1 in which the rate at which the aqueous solution is contacted with the grafted polypropylene is 1–15%, by weight, of the rate of extrusion of the grafted polymer.

10. The method of claim 1 in which the rate at which the aqueous solution is contacted with the grafted polypropylene is 3–7%, by weight, of the rate of extrusion of the grafted polymer.

11. The method of claim 1 in which the polypropylene is a homopolymer of propylene.

12. The method of claim 1 in which the polypropylene is selected from the group consisting of block copolymers of ethylene and propylene containing less than 25% by weight of ethylene and random copolymers of ethylene and propylene containing less than 8% by weight of ethylene.

* * * * *